United States Patent
Cho et al.

(10) Patent No.: US 10,903,704 B2
(45) Date of Patent: Jan. 26, 2021

(54) FAN MOTOR FOR AIR CONDITIONER

(71) Applicant: SAMSUNG ELECTRONICS CO., LTD., Suwon-si (KR)

(72) Inventors: Jin-woo Cho, Seongnam-si (KR); Nam-su Kim, Seoul (KR); Uk-ho Seo, Bucheon-si (KR); Jong-jun Seo, Suwon-si (KR); Ji-hoon Han, Yongin-si (KR); Min-woo Hong, Wanju-Gun (KR); Woong Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 15/471,743

(22) Filed: Mar. 28, 2017

(65) Prior Publication Data

US 2017/0317567 A1   Nov. 2, 2017

(30) Foreign Application Priority Data

Apr. 29, 2016  (KR) .................. 10-2016-0053289

(51) Int. Cl.
*H02K 1/30* (2006.01)
*H02K 1/27* (2006.01)
(Continued)

(52) U.S. Cl.
CPC .............. *H02K 1/30* (2013.01); *H02K 1/276* (2013.01); *H02K 1/2706* (2013.01); *H02K 1/28* (2013.01);
(Continued)

(58) Field of Classification Search
CPC .... H02K 1/2706; H02K 1/272; H02K 1/2726; H02K 1/274; H02K 1/27; H02K 1/28; H02K 1/30; H02K 15/03
(Continued)

(56) References Cited

U.S. PATENT DOCUMENTS 5,200,662 A * 4/1993 Tagami ............... H02K 1/2773
                                                      310/114
5,298,826 A * 3/1994 Lee ...................... H02K 1/2733
                                                      310/156.09
(Continued)

FOREIGN PATENT DOCUMENTS

CN       202260740      5/2012
CN       102893222      1/2013
(Continued)

OTHER PUBLICATIONS

Espacenet English Machine translation of JPH07312852A, Kajimoto, Nov. 1995. (Year: 1995).*
(Continued)

*Primary Examiner* — Burton S Mullins
(74) *Attorney, Agent, or Firm* — Staas & Halsey, LLP

(57) ABSTRACT

A fan motor for an air conditioner includes a rotor shaft, a plurality of rotor cores arranged in a circumferential direction about a center of the rotor shaft, a bridge configured to couple the rotor cores, permanent magnets coupled to the plurality of rotor cores, and an insert-injected rotor body provided in a space formed through the rotor shaft, the rotor cores, the bridge, and the permanent magnets. A cable holder for the fan motor includes an upper cable holder in which a plurality of protrusion walls are formed downwardly, a lower cable holder in which a plurality of guide walls coupled between the plurality of protrusion walls are formed upwardly, and a soldering land which is formed in a lower portion of the lower cable holder and upon which a wire can be soldered.

17 Claims, 15 Drawing Sheets

(51) Int. Cl.
  *H02K 15/03* (2006.01)
  *H02K 7/00* (2006.01)
  *H02K 1/28* (2006.01)
  *H02K 7/14* (2006.01)
  *F24F 1/0003* (2019.01)
  *F24F 1/38* (2011.01)
  *F24F 7/007* (2006.01)
  *H02K 5/22* (2006.01)
  *H02K 16/02* (2006.01)

(52) U.S. Cl.
  CPC .............. *H02K 7/003* (2013.01); *H02K 7/14* (2013.01); *F24F 1/0003* (2013.01); *F24F 1/38* (2013.01); *F24F 7/007* (2013.01); *H02K 1/2773* (2013.01); *H02K 5/225* (2013.01); *H02K 16/02* (2013.01)

(58) Field of Classification Search
  USPC ................................ 310/43, 156.48–156.61
  See application file for complete search history.

(56) References Cited

U.S. PATENT DOCUMENTS

| | | | | |
|---|---|---|---|---|
| 5,554,900 | A * | 9/1996 | Pop, Sr. | H02K 1/2773 310/156.61 |
| 5,724,826 | A * | 3/1998 | Han | F24F 1/06 62/183 |
| 5,786,650 | A * | 7/1998 | Uchida | H02K 1/2773 310/156.55 |
| 5,829,120 | A | 11/1998 | Uchida et al. | |
| 5,886,441 | A | 3/1999 | Uchida et al. | |
| 5,889,346 | A | 3/1999 | Uchida et al. | |
| 5,939,810 | A | 8/1999 | Uchida et al. | |
| 6,429,566 | B1 * | 8/2002 | Kuwahara | H02K 1/2773 310/156.56 |
| 7,012,346 | B2 * | 3/2006 | Hoffman | H02K 5/08 310/216.074 |
| 7,157,827 | B2 * | 1/2007 | Heideman | H02K 1/2773 310/156.47 |
| 7,456,539 | B2 * | 11/2008 | Matsumoto | H02K 1/276 310/156.21 |
| 7,709,991 | B2 * | 5/2010 | Ionel | H02K 1/22 310/156.74 |
| 8,415,849 | B2 * | 4/2013 | Mizuno | H02K 1/276 310/156.53 |
| 8,436,497 | B2 * | 5/2013 | Horng | H02K 15/12 310/156.08 |
| 8,519,588 | B2 * | 8/2013 | Amrhein | H02K 1/276 310/156.56 |
| 8,750,768 | B2 * | 6/2014 | Kotani | H01F 7/0221 399/277 |
| 8,922,083 | B2 * | 12/2014 | Asahi | H02K 1/2706 310/156.08 |
| 9,003,639 | B2 * | 4/2015 | Haruno | H02K 1/2766 29/598 |
| 9,099,905 | B2 * | 8/2015 | Manz | H02K 1/2773 |
| 9,343,935 | B2 * | 5/2016 | Mader | H02K 1/2773 |
| 10,199,892 | B2 | 2/2019 | Ekin et al. | |
| 2005/0012411 | A1 | 1/2005 | Hoffman | |
| 2006/0066166 | A1 * | 3/2006 | Hauger | H02K 1/2773 310/156.53 |
| 2007/0132336 | A1 | 6/2007 | Ionel et al. | |
| 2011/0291498 | A1 | 12/2011 | Sakata et al. | |
| 2012/0149243 | A1 | 6/2012 | Ohnishi et al. | |
| 2013/0051865 | A1 | 2/2013 | Kotani et al. | |
| 2013/0057103 | A1 * | 3/2013 | Han | H02K 1/2773 310/156.12 |
| 2013/0285498 | A1 * | 10/2013 | Yang | H02K 1/27 310/156.12 |
| 2014/0300243 | A1 * | 10/2014 | Berkouk | H02K 1/06 310/216.048 |
| 2015/0028710 | A1 * | 1/2015 | Oka | H02K 1/2773 310/156.48 |
| 2015/0244218 | A1 | 8/2015 | Kaufmann et al. | |
| 2015/0303751 | A1 | 10/2015 | Ekin et al. | |
| 2015/0318746 | A1 * | 11/2015 | Miyajima | H02K 1/2773 310/71 |
| 2016/0006303 | A1 | 1/2016 | Hoemann et al. | |
| 2016/0043620 | A1 | 2/2016 | Li et al. | |
| 2016/0254711 | A1 * | 9/2016 | Kawamoto | H02K 1/2773 310/43 |

FOREIGN PATENT DOCUMENTS

| | | | |
|---|---|---|---|
| CN | 104871404 | 8/2015 | |
| CN | 204922229 | 12/2015 | |
| EP | 0381769 | 8/1990 | |
| EP | 2403109 | 1/2012 | |
| EP | 2696471 | 2/2014 | |
| JP | 6-245451 | 9/1994 | |
| JP | 7-312852 | 11/1995 | |
| JP | 2006-158008 | 6/2006 | |
| JP | 2006158008 A * | 6/2006 | .............. H02K 1/22 |
| JP | 2009-93932 | 4/2009 | |
| JP | 2012-123999 | 6/2012 | |
| JP | 5493675 | 5/2014 | |
| KR | 1999-0038389 | 10/1999 | |
| KR | 10-0504704 | 8/2005 | |
| KR | 10-2006-0083323 | 7/2006 | |
| KR | 10-2008-0028562 | 4/2008 | |
| KR | 10-2008-0077838 | 8/2008 | |
| KR | 10-1274488 | 6/2013 | |
| KR | 10-2013-0122330 | 11/2013 | |
| KR | 10-1546318 | 8/2015 | |

OTHER PUBLICATIONS

English machine translation, Kuwano, JP 2006158008. (Year: 2006).*
Extended European Search Report dated Dec. 13, 2017 in European Patent Application No. 17164380.2.
Partial European Search Report dated Sep. 8, 2017 n European Patent Application No. 17164380.2.
European Office Action dated European Communication dated Feb. 26, 2019 in European Patent Application No. 17164380.2.
European Communication under Rule 71(3) dated Nov. 7, 2019 in European Patent Application No. 17164380.2.
Korean Office Action dated May 13, 2020 in Korean Patent Application No. 10-2016-0053289.
Chinese Office Action dated Apr. 22, 2020 in Chinese Patent Application No. 201710293315.3.
Chinese Office Action dated Nov. 5, 2020 in Chinese Patent Application No. 201710293315.3.
Korean Office Action dated Sep. 1, 2020 in Korean Patent Application No. 10-2016-0053289.

* cited by examiner

FAN MOTOR FOR AIR CONDITIONER

CROSS-REFERENCE TO RELATED APPLICATIONS

This application claims priority from Korean Patent Application No. 10-2016-0053289, filed on Apr. 29, 2016, in the Korean Intellectual Property Office, the disclosure of which is incorporated herein by reference in its entirety.

BACKGROUND

1. Field

Apparatuses and methods with respect to exemplary embodiments disclosed herein relate to a fan motor for an air conditioner, and more particularly, to a fan motor for an air conditioner in which a rotor core and a rotor shaft thereof are firmly integrated through insert injection and provides a cable holder with easier wire insertion and improved soldering workability.

2. Description of the Related Art

In general, air conditioners may be apparatuses used for cooling or heating rooms and may perform a cooling operation or a heating operation through characteristics that absorb surrounding heat in vaporization of a liquid refrigerant and release heat in liquefaction of the liquid refrigerant by employing the conventional refrigeration cycle that the refrigerant is circulated between an indoor unit and an outdoor unit.

Fans may be installed in the indoor unit and the outdoor unit to assist absorption and release of the heat and fan motors may be used to control air volumes of the fans.

The fan motor installed in the outdoor unit may serve to assist the heat release in the cooling operation and promote the heat absorption in the heating operation and may have significant effect on an installation area and performance securement of the outdoor unit.

The related fan motor may be a magnetic flux concentration type permanent magnetic motor. In the related fan motor, bridges which couple a plurality of rotor cores may be formed between the rotor cores to prevent scattering of the plurality of rotor cores. Since the magnet flux generated in the permanent magnet is leaked through the bridges, the bridges may be formed in a minimum size sufficient to prevent the scattering of the rotor cores. For example, the bridges may be partially formed in partial rotor cores at intervals along length directions of the rotor cores.

The rotor shaft may be coupled to a hole formed in the center of the bridge through a press-fitting process, but the bridge structure may be deformed or broken in the press-fitting process.

Partial rotor cores which are not coupled to the bridges may be scattered by centrifugal force generated in high-speed rotation of the rotor.

The structure that couples the rotor cores by allowing the rotor shaft to pass through the rotor core along the length direction of the rotor core to prevent the scattering of the rotor core has been proposed. However, the bridge may support the whole weight of the rotor core and a rivet in such a structure and all the rotor cores may be scattered by the centrifugal force.

To overcome the problem, the structure that end plates are disposed over and below the rotor cores and are fastened through the rivet has been proposed. However, cost may be increased due to lots of components and assembly workability may be degraded due to the need for a high degree of dimensional tolerance between a diameter of a rivet and a diameter of a rivet hole formed in the rotor core.

An external wire may be inserted into and soldered to the related fan motor for an air conditioner. However, a connector into which the wire is inserted is vulnerable to vibration and thus production reliability may be degraded.

A cable holder has been used as a soldering method in the related art. The workability may be degraded due to difficulty in inserting the wire into the hole of the cable holder. Additional insulation distance, which is inevitably ensured due to the wire protruding through the hole of the cable holder, may be an obstacle to miniaturization of the production.

SUMMARY

Exemplary embodiments may overcome the above disadvantages and other disadvantages not described above. Also, an exemplary embodiment is not required to overcome the disadvantages described above, and an exemplary embodiment may not overcome any of the problems described above.

One or more exemplary embodiments relate to a rotor structure that a coupling force between a rotor shaft and a rotor core of a rotor in which bridges are partially formed in a magnetic flux concentration type permanent magnetic fan motor is strong and the rotor core and the rotor shaft are integrally formed through insert injection to prevent scattering of a bridge-free rotor core.

One or more exemplary embodiments relate to a fan motor having a cable holder structure with ease wire insertion and improved soldering workability.

One or more exemplary embodiments relate to a fan motor having a cable holder structure such that wire formation is easy and an additional insulation distance is unnecessary due to no wire protrusion.

According to an aspect of an exemplary embodiment, there is provided a fan motor for an air conditioner including a stator, and a rotor rotatably installed in an inside of the stator. The rotor may include a rotor shaft, a plurality of rotor cores arranged in a circumferential direction about a center of the rotor shaft, a plurality of permanent magnets disposed between the plurality of rotor cores, and a supporting member formed to support the rotor by being insert-injected.

Additional aspects and advantages of the exemplary embodiments are set forth in the detailed description, and will be apparent from the detailed description, or may be learned by practicing the exemplary embodiments.

BRIEF DESCRIPTION OF THE DRAWINGS

The above and/or other aspects and advantages of the disclosure will be more apparent and more readily appreciated by describing certain exemplary embodiments of the disclosure with reference to the accompanying drawings, in which.

DETAILED DESCRIPTION

Figure 1:
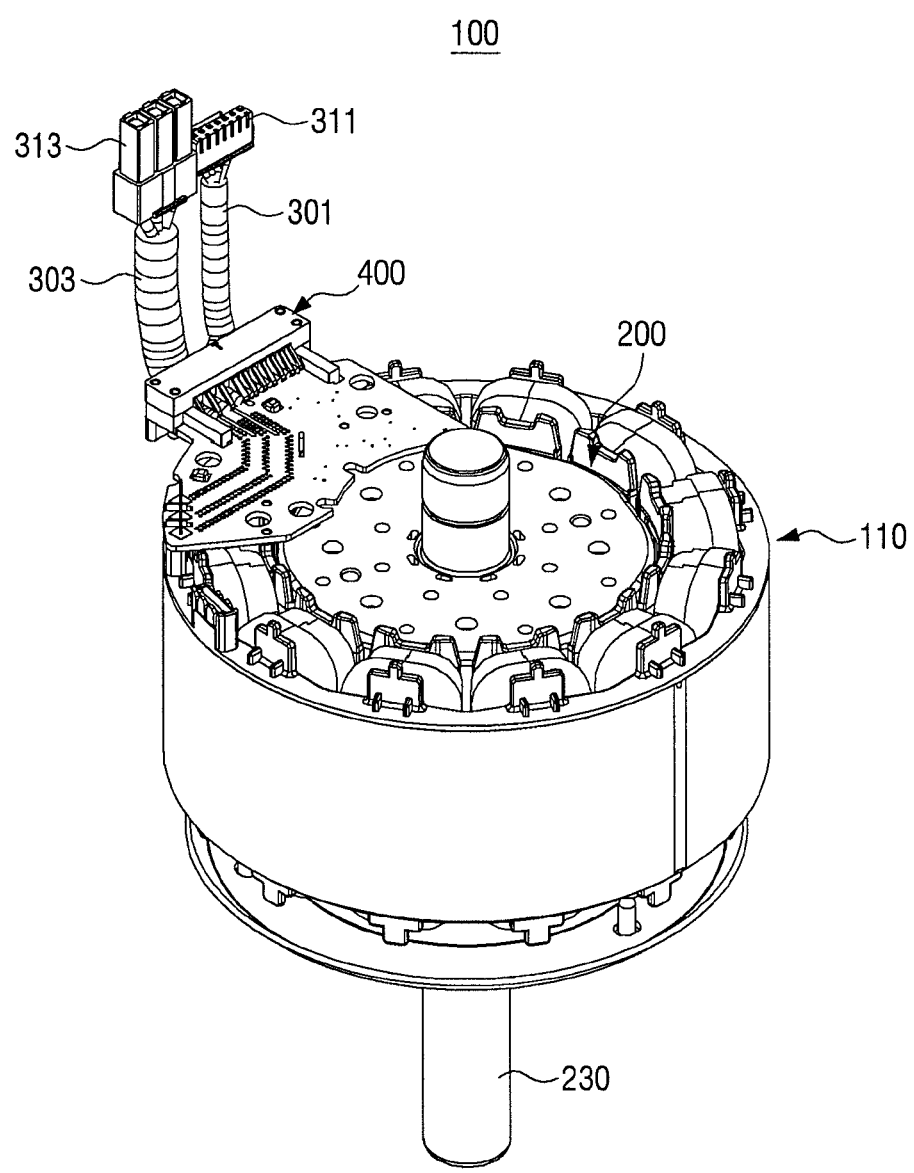
FIG. 1 is a perspective view illustrating a fan motor for an air conditioner to which a wire is coupled through a cable holder according to an exemplary embodiment.

Various embodiments will now be described more fully with reference to the accompanying drawings in which some embodiments are shown. The techniques described herein are exemplary, and should not be construed as implying any particular limitation on the disclosure. It should be understood that various alternatives, equivalents, and/or modifications could be devised by those skilled in the art. In the following description, unless otherwise described, the same reference numerals are used for the same elements when they are depicted in different drawings.

It will be understood that, although the terms first, second, etc. may be used herein in reference to elements of the disclosure regardless of an order and/or importance, such elements should not be construed as limited by these terms. The terms are used only to distinguish one element from other elements. For example, without departing from the spirit of the inventive concept, a first element may refer to a second element, and similarly, the second element may refer to the first element.

As used herein, the singular forms "a," "an" and "the" are intended to include the plural forms as well, unless the context clearly indicates otherwise. The terminology used herein is for the purpose of describing particular embodiments only and is not intended to be limiting of the disclosure. Unless otherwise defined, all terms (including technical and scientific terms) used herein have the same meaning as commonly understood by one of ordinary skill in the art to which this inventive concept belongs. Terms defined in general dictionaries among the terms used herein may be interpreted to have the same meaning as or the similar meaning to the contextual meaning of the related technology. Unless otherwise defined, the terms used herein may not be interpreted to have the ideal or overly formal meaning. In some cases, even terms defined herein may not be interpreted to exclude the exemplary embodiments herein.

Figure 2:
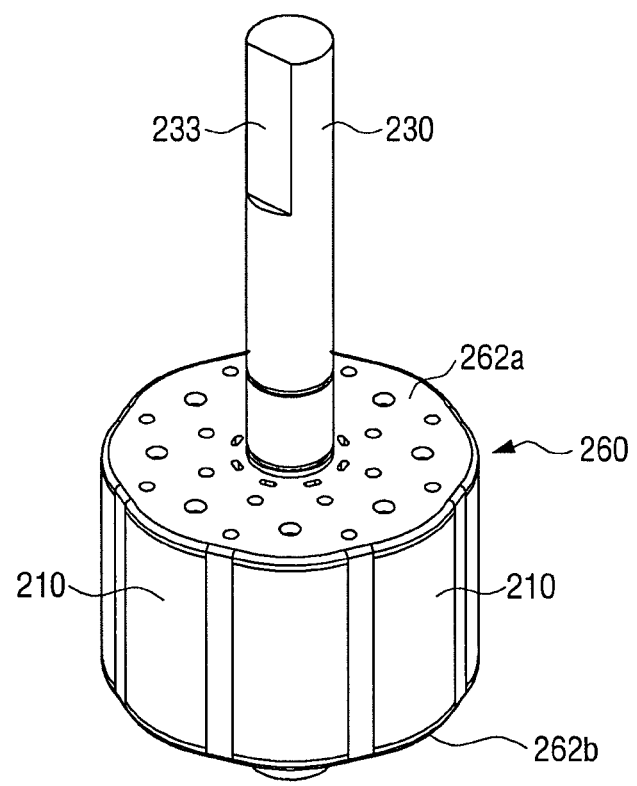
FIG. 2 is a perspective view illustrating a rotor according to an embodiment.
Figure 3:
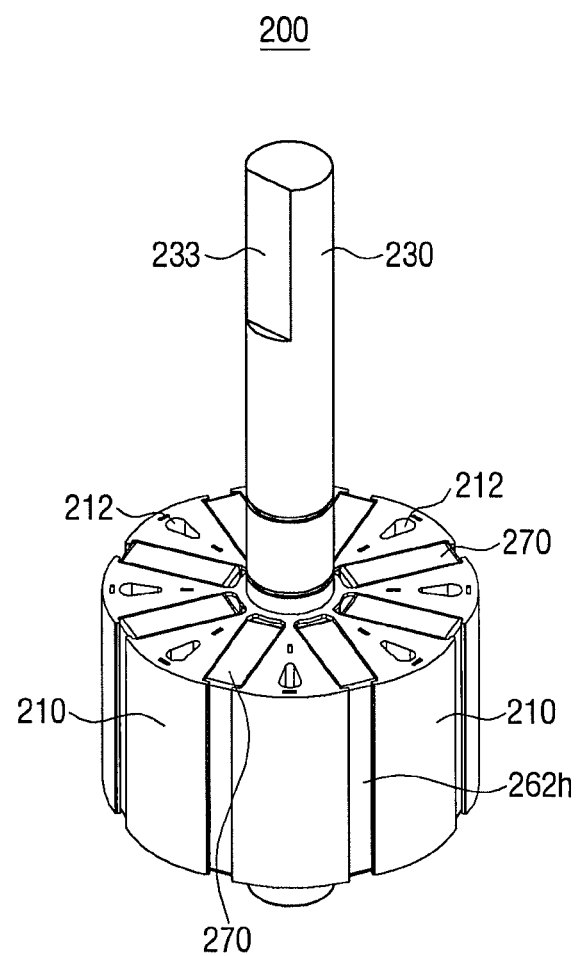
FIG. 3 is a perspective view illustrating the rotor that an injection molding part is omitted in FIG. 2.
Figure 4:
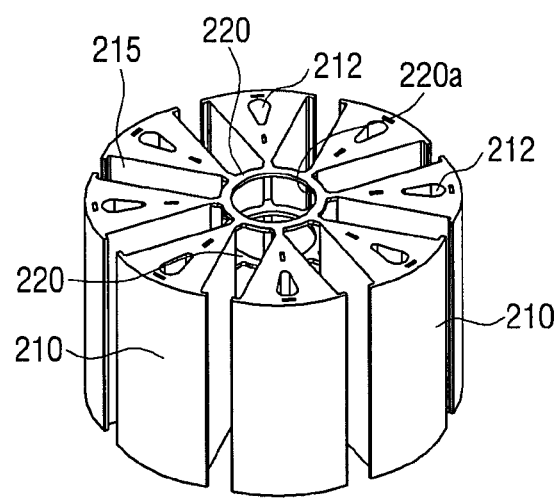
FIG. 4 is a perspective view illustrating rotor cores illustrated in FIG. 3.
Figure 5:
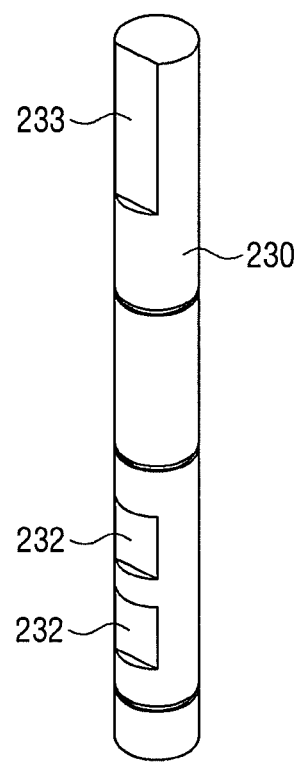
FIG. 5 is a perspective view illustrating a rotor shaft illustrated in FIG. 3.
Figure 6:
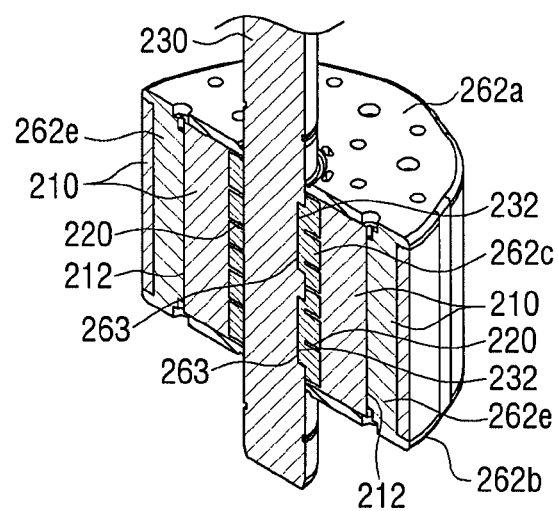
FIG. 6 is a perspective view illustrating a longitudinal cross-section of a rotor in which a D cut-formed rotor shaft and a rotor core are mutually coupled through an injection-molded supporting member according to an exemplary embodiment.

FIG. 1 is a perspective view illustrating a fan motor for an air conditioner to which a wire is coupled through a cable holder according to an exemplary embodiment. FIG. 2 is a perspective view illustrating a rotor according to an embodiment. FIG. 3 is a perspective view illustrating the rotor that an injection molding part is omitted. FIG. 4 is a perspective view illustrating rotor cores. FIG. 5 is a perspective view illustrating a rotor shaft. FIG. 6 is a perspective view illustrating a longitudinal cross-section of a rotor in which a D cut-formed rotor shaft and a rotor core are mutually coupled through an injection-molded supporting member.

A rotor structure of a fan motor 100 for an air conditioner according to an exemplary embodiment will be described in detail with reference to FIGS. 1 to 6.

Referring to FIG. 1, the fan motor 100 may include a stator 110 and a rotor 200 rotatably disposed in the inside of the stator 110.

Referring to FIGS. 2 and 3, the rotor 200 may be a rotor of a magnetic flux concentration type permanent magnetic motor. The rotor 200 may include a rotor shaft 230, a rotor core 210, a bridge 220, a permanent magnet 270, and a rotor body 260.

Referring to FIG. 4, the fan motor may include a plurality of rotor cores 210 and the plurality of rotor cores 210 may be arranged in a circumferential direction about the center of the rotor shaft 230. A space 215 into which the permanent magnet 270 is inserted may be formed between the rotor cores 210.

Each of the rotor cores 210 may be configured of a plurality of electric steel sheets having a plate shape and laminated along a length direction of the rotor shaft 230. A material for the rotor core 210 is not limited to the electrical steel sheet and may be arbitrarily changed in consideration of electric conductivity, weight, economy efficiency, and the like.

A core hole 212 may be formed in the rotor core to pass through the rotor core 210 along the length direction of the rotor core 210. Scattering of the rotor core 210 may be prevented by filling a resin for injection to be described later within the core hole 212.

The core hole 212 may not be formed to have a circular shape but may be formed to have a non-circular shape, for example, an elongated shape having a fixed length to a radial direction of the rotor core 210. This is because as compared with the core hole 212 having a circular shape, bending stiffness of the resin to be filled within the core hole 212 is increased in the core hole 212 having an elongated structure.

As a size of the core hole 212 is increased, a size of the resin filled within the core hole may be increased and may be advantageous to scattering prevention. However, the large-sized core hole 212 may hinder the flow of the magnetic flux generated in the permanent magnet 270. Accordingly, the size of the core hole 212 may be optimized in consideration of such a condition.

The bridge 220 may be formed to couple the separated rotor cores 210. The bridge 220 may be formed to prevent the rotor core from being scattered through centrifugal force in rotation of the rotor core 210.

However, in response to the bridges 220 being formed in all the electric steel sheets constituting the rotor cores 210, the magnetic flux generated in the permanent magnet 270 may be leaked through the bridges 220. Accordingly, the bridges 220 may be formed only in partial electric steel sheets among the laminated electric steel sheets constituting the rotor cores 210. The bridges formed in the partial electric steel sheets among the laminated electric steel sheets constituting the rotor cores 210 may collectively be referred to as "a partial bridge".

Each of the bridges 220 may be formed to couple portions of electric steel sheets disposed in the same layer, which are close to the rotor shaft 230, among the electric steel sheets constituting the plurality of rotor cores 210. Accordingly, electric steel sheets in which the bridges 220 are not formed may be presented among the electric steel sheets constituting the plurality of rotor cores 210.

The rotor shaft 230 may be inserted into holes 220a formed in the centers of the bridges 220 and coupled to the bridges 220. An outer diameter of the rotor shaft 230 may be formed smaller than an inner diameter of the hole 220a formed in the center of the bridge 220.

In the related art, the outer diameter of the rotor shaft 230 may be formed larger than the inner diameter of the hole 220a formed in the center of the bridge 220 and the rotor shaft 230 may be coupled to the bridge 220 through an interference fitting manner. However, in the exemplary embodiment, the diameter of the rotor shaft 230 may be formed smaller than the inner diameter of the hole 220a formed in the center of the bridge 220 and a space between the rotor shaft 230 and the bridge 220 may be filled with a resin through an insert injection process. Accordingly, the rotor shaft 230 may be firmly coupled to the bridge 220 through the resin.

In response to the rotor shaft 230 and the bridge 220 being coupled through the above-described coupling method of the exemplary embodiment, the risks of deformation and damage of the bridge 220 may be removed. The fan motor may be freely manufactured with respect to the dimensional tolerances of the inner diameter of the hole 220a of the bridge 220 and the outer diameter of the rotor shaft 230 and thus the fastening workability may be improved.

Referring to FIGS. 5 and 6, a D cut 232 may be formed in an outer circumference of an insertion portion of the rotor shaft 230 which is inserted into the rotor cores 210 so that a resin may be filled within the D cut 232 in injection molding to increase the coupling force between the rotor core 210 and the rotor shaft 230. A cross-section of the rotor shaft 230 may be formed to have a non-circular shape due to the D cut 232. The D cut 232 of the rotor shaft 230 may ensure the space into which the resin is filled between the rotor core 210 and the rotor shaft 230 and provide more strong coupling force so as not to prevent the rotor core 210 and the rotor shaft 230 from running idle.

A plurality of D cuts 232 may be formed in the rotor shaft. A D cut 233 for coupling to other components may be generally formed in an end portion of the rotor shaft 230. In response to the D cut 232 being additionally formed in the portion of the rotor shaft 230 inserted into the rotor core 210, the D cut 232 may be formed in an opposite direction to the D cut 233 in the end portion of the rotor shaft 230. In response to all the D cuts 232 and 233 being formed in one-side direction, vibration may be caused due to unbalance of mass in motor rotation.

The permanent magnet 270 may be inserted into the space 215 between the rotor core 210 and a rotor core 210 close to the rotor core 210 and may be coupled to the rotor cores 210.

The rotor body 260 may be integrally formed in a space formed through the rotor shaft 230, the rotor cores 210, the bridges 220, and the permanent magnets 270 through insert injection for resin insertion.

The resin may be formed between the rotor core 210 and the rotor shaft 230 and between the rotor core 210 and the permanent magnet 270 and thus the coupling force of the rotor core 210 may serve to hold the rotor cores 210 and the permanent magnets 270 against the centrifugal force.

For example, the resin which exists in the insides of the core holes 212 formed in the separate rotor cores 210 may play an important role in preventing scattering of the rotor cores 210. Accordingly, in the exemplary embodiment, the scattering of partial electric steel sheets in which the bridges 220 are not formed among the electric steel sheets constituting the rotor cores 210 may be prevented without use of a rivet.

The resin may cover upper portions and lower portions of the rotor cores 210 configured of a plurality of laminated electric steel sheets. For example, the rotor body 260 may have a structure that covers the upper portions and lower portions of the rotor cores 210 configured of the plurality of electric steel sheets laminated to a direction of the rotor shaft 230.

Figure 7:
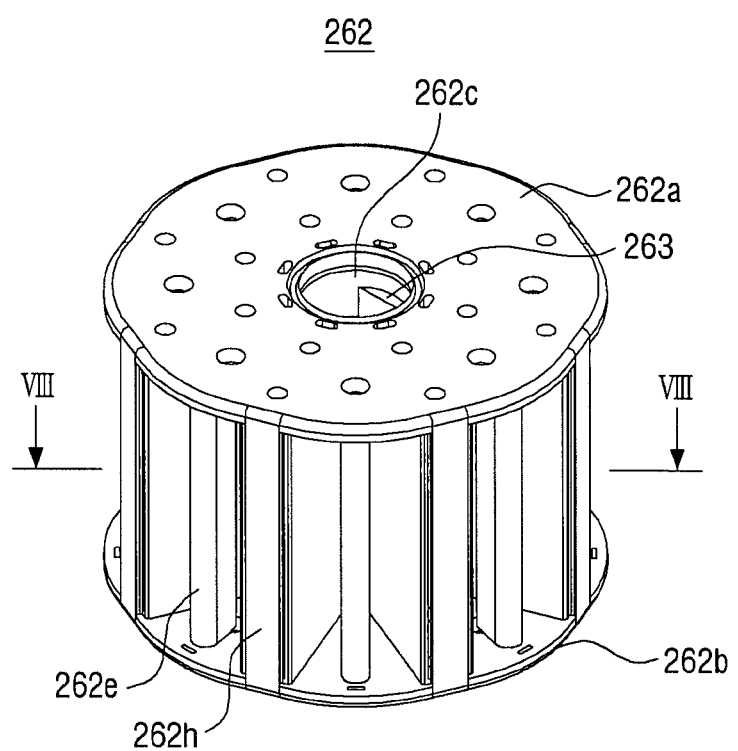
FIG. 7 is a perspective view illustrating a shape of an injection-molded supporting member according to an exemplary embodiment.
Figure 8:
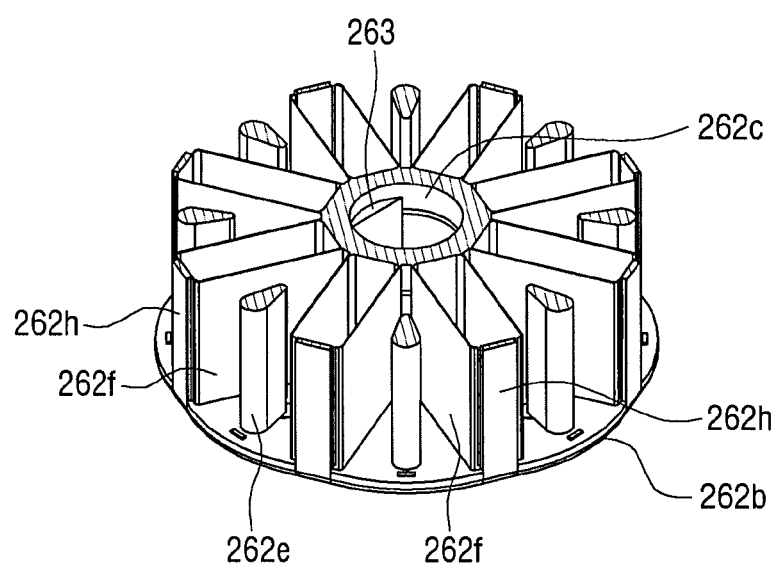
FIG. 8 is a perspective view illustrating a lateral cross-section of the supporting member illustrated in FIG. 7.

FIG. 7 is a perspective view illustrating a shape of an injection-formed supporting member according to an exemplary embodiment and FIG. 8 is a perspective view illustrating a longitudinal cross-section of the supporting member illustrated in FIG. 7.

The resin used in the insert injection may be configured of a non-magnetic material so as not to hinder flow of the magnetic flux due to the resin.

The strength of the rotor body 260 may be increased by adding glass fiber to the resin constituting the rotor body 260.

Referring to FIGS. 7 and 8, the supporting member 262 formed through insert injection may include an upper molding part 262a covering the upper portions of the rotor cores 210, a lower molding part 262b covering the lower portions of the rotor cores 210, and a first connection molding part 262c, a second connection molding part 262e, a third connection molding part 262f, and a fourth connection molding part 262h mutually coupled to the upper and lower molding parts 262a and 262b.

The upper and lower molding parts 262a and 262b may be configured in a plate shape having a fixed thickness and may entirely cover upper sides and lower sides of the rotor cores. The upper and lower molding parts 262a and 262b may be firmly coupled to each other through the first to fourth connection molding parts 262c, 262e, 262f, and 262h.

The first connection molding part 262c may be formed between the rotor core 210 and the rotor shaft 230 as illustrated in FIG. 6. Since a protrusion portion 263 of the first connection molding part 262c is filled within the D cut 232 of the rotor shaft 230, the rotor core 210 and the rotation shaft 230 may be firmly coupled to each other. Slipping between the rotor core 210 and the rotor shaft 230 in rotation of the rotor 200 may be fundamentally prevented through the first connection molding part 262c.

The second connection molding part 262e may be formed to be filled within the core hole 212 of each of the rotor cores 210 and may be configured to correspond to the shape of the hole 212. Accordingly, the second connection molding part 262e may firmly couple the plurality of electric steel sheets constituting each of the rotor cores 210 and may prevent scattering of the electric steel sheets in which the bridges 220 are not formed.

The third connection molding part 262f may be formed between the rotor core 210 and the permanent magnet 270. Since a side of the permanent magnet 270 is surrounded with the third connection molding part 262f, the deviation of the permanent magnet 270 to a circumferential direction of the rotor shaft 230 may be prevented. The deviation of the permanent magnet 270 to the length direction of the rotor shaft 230 may be prevented through the upper and lower molding parts 262a and 262b.

The fourth connection molding part 262h may be formed to be elongated from an outer side of the third connection molding part 262f and may be exposed to the outside of the rotor 200 as illustrated in FIG. 3. The fourth connection molding part 262h may be integrally formed with the upper and lower molding parts 262a and 262b and may firmly support the supporting member 262.

As described above, the rotor core 210, the rotor shaft 230, and the permanent magnet 270 in the rotor 200 may be firmly configured in an integral form through the supporting member 262 formed through the insert injection. Accordingly, in the exemplary embodiment, the scattering of the rotor core 210 in the rotation of the rotor 200 may be prevented, the weight of the rotor may be light due to nonuse of a separate rivet, and the structure and the manufacturing process of the rotor may be simplified.

In the fan motor 100 for an air conditioner according to the exemplary embodiment, soldering of wires 301 and 303 may be accomplished to the fan motor 100 through a cable holder 400 as illustrated in FIG. 1.

For example, the fan motor 100 may include a cable holder 400 which holds and guides the wires 301 and 303 for a soldering work of the wires 301 and 303 to which connectors 311 and 313 are coupled, a soldering land (see 500 of FIG. 13) in which the soldering on the wires 301 and 303 is performed, and a printed circuit board (PCB) (see 600 of FIG. 13) to which the cable holder 400 is fixed.

Figure 9:
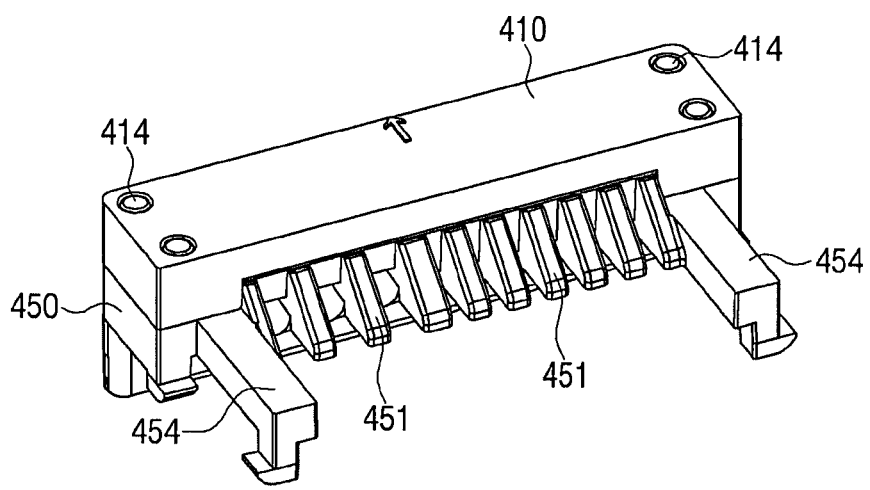
FIG. 9 is a perspective view illustrating a cable holder of a fan motor for an air conditioner according to an exemplary embodiment.
Figure 10:
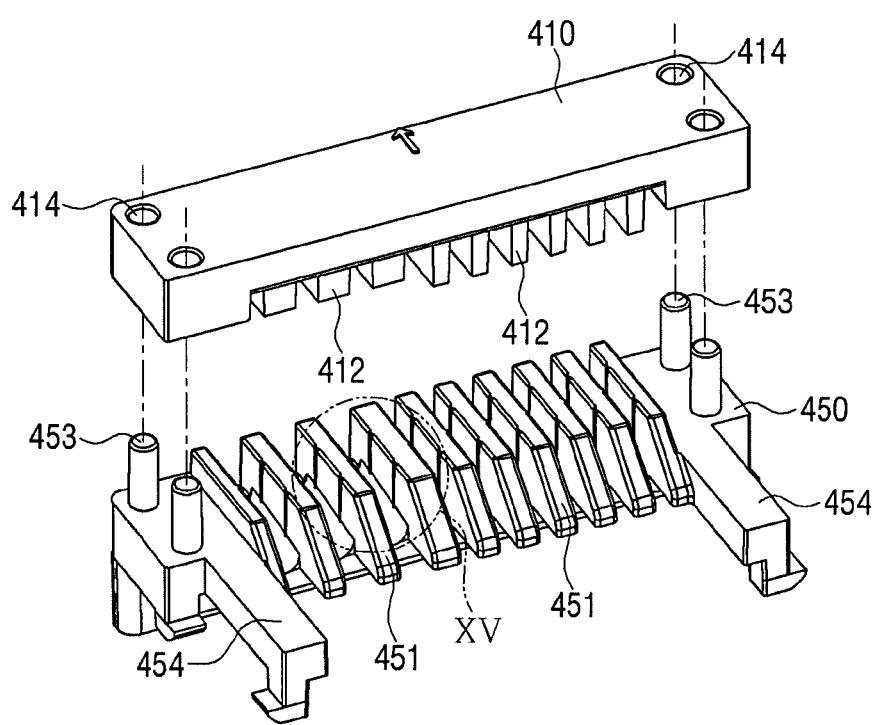
FIG. 10 is an exploded view illustrating the cable holder illustrated in FIG. 9.

FIG. 9 is a perspective view illustrating a cable holder of a fan motor for an air conditioner according to an exemplary embodiment and FIG. 10 is an exploded view illustrating the cable holder.

Referring to FIGS. 9 and 10, the cable holder 400 may include an upper cable holder 410 and a lower cable holder 450.

A plurality of protrusion walls 412 may be formed downwardly in the upper cable holder 410. The protrusion walls 412 may serve to guide the wires 301 and 303 inserted into the cable holder 400 together with guide walls 451 of the lower cable holder 450 to be described later.

Thicknesses of the plurality of protrusion walls 412 may be the same as each other. However, the types of wires 301 and 303 inserted into the cable holder 400 may be versified and the wires 301 and 303 having different thicknesses may be inserted into the cable holder 400 and thus the protrusion walls 412 may be formed to have different thicknesses according to the types and thicknesses of the wires 301 and 303.

A fastening groove 414 may be formed in the upper cable holder 410. A fastening protrusion 453 of the lower cable holder 450 to be described later may be inserted into the fastening groove 414.

Only one fastening groove 414 may be formed or a plurality of fastening grooves 414 may be formed. The number of fastening grooves 414 may be suitably controlled according to the desired fastening force.

A plurality of guide walls 451 may be formed upwardly in the lower cable holder 450. The guide walls 451 may be coupled between protrusion walls 412 of the upper cable holder 410.

The guide walls 451 may be configured to guide the wires 301 and 303 in response to the wires 401 and 303 being inserted into the cable holder and allow an operator to insert the wire 301 and 303 into correct positions.

In response to the upper cable holder 410 being coupled to the lower cable holder 450, a wire lead-in space (see 455 of FIG. 12) may be formed through a bottom surface of the protrusion wall 412 of the upper cable holder 410, the guide walls 451 of the lower cable holder 450 formed at both sides of the protrusion wall 412, and a floor (see 452 of FIG. 12) coupling the guide walls 451.

The wire may be inserted into the wire lead-in space 455 and may be guided through the protrusion wall 412 of the upper cable holder 410, the guide walls 451 of the lower cable holder 450, and the floor 452 coupling the guide walls 451.

A width of the wire lead-in space 455 may be smaller than those of the wires 301 and 303. Accordingly, in response to the wires 301 and 303 being inserted into the wire lead-in spaces 455, the wires 301 and 303 may be coupled to the cable holder in an interference fitting manner. Accordingly, the wires 301 and 303 inserted into the wire lead-in spaces 455 may be stably coupled to the cable holder and contact failure due to vibration and the like may be prevented.

Figure 11:
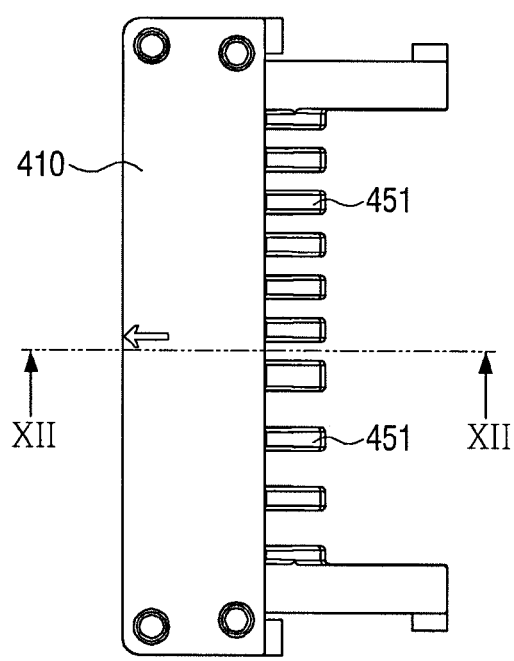
FIG. 11 is a plan view illustrating the cable holder illustrated in FIG. 9.
Figure 12:
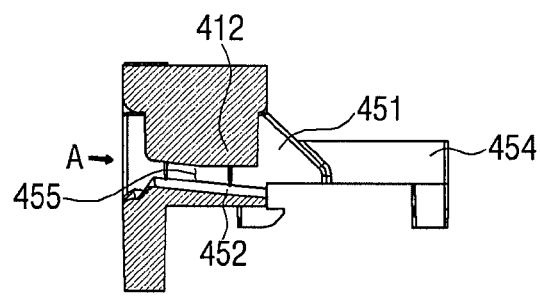
FIG. 12 is a cross-sectional diagram illustrating the cable holder taken along line XII-XII of FIG. 11.
Figure 13:
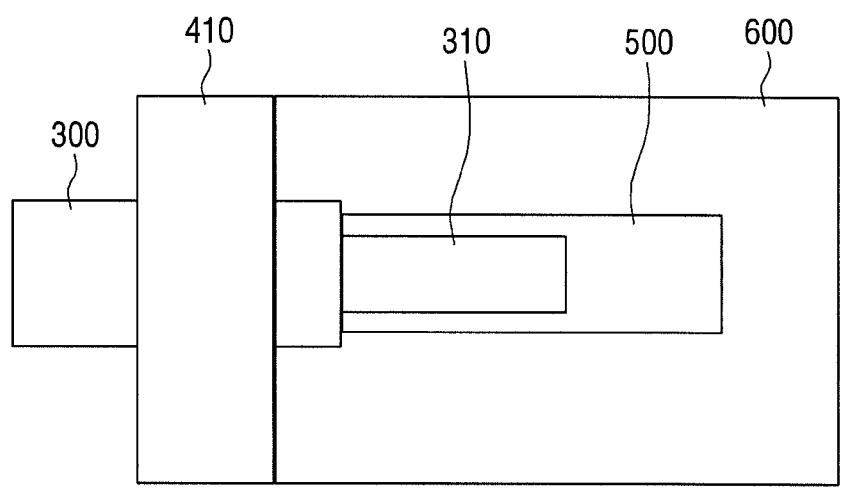
FIG. 13 is an enlarged plan view illustrating a cable holder mounted on a board according to an exemplary embodiment.

FIG. 11 is a plan view of a cable holder according to an exemplary embodiment, FIG. 12 is a cross-sectional diagram illustrating the cable holder, and FIG. 13 is an enlarged plan view illustrating the cable holder mounted on a board.

Referring to FIGS. 11 to 13, the wire lead-in space 455 may be formed to be inclined downwardly toward a wire lead-in direction (A direction) so as to approach the soldering land 500.

For example, a length of the protrusion wall 412 of the upper cable holder 410 may be increased downwardly toward the wire lead-in direction.

A height of the floor 452 coupling the guide walls 451 of the lower cable holder 450 may be reduced toward the wire lead-in direction.

The soldering land 500 to be described later may be formed to a horizontal direction in succession with the structure that the wire lead-in space 455 is inclined downwardly toward the wire lead-in direction.

In response to the wires 301 and 303 being inserted into the inclined wire lead-in spaces 455, the end portions of the inserted wires 301 and 303 may be bent in parallel to the soldering land 500. Accordingly, the inserted wires 301 and 303 may not be easily released due to tension.

The guide wall 451 of the lower cable holder 450 may be formed to have a height reduced toward the wire lead-in direction. This is to expose the end portions of the wires 301 and 303 so that the operator easily performs a soldering work on the inserted wires 301 and 303.

The cable holder in the related art may serve only to support the wires 301 and 303 and the wires 301 and 303 may not be neatly arranged. Accordingly, the wire formation may be difficult.

However, in response to the wires 301 and 303 being inserted into the wire lead-in spaces 455 of the cable holder according to the exemplary embodiment, the wires 301 and 303 may be separated through the guide walls 451 and the protrusion walls 412 and the wires 301 and 303 may be neatly arranged. Accordingly, the wire formation may be easy.

In response to the wires 301 and 303 being inserted into the cable holder according to the exemplary embodiment, protrusion portions of the wires may not exist and an additional insulation distance may not be necessary. Accordingly, a compact fan motor 100 may be accomplished.

The soldering land 500 may be coupled to a lower portion of the lower cable holder 450.

The soldering land 500 may be a region for the soldering of the wires 301 and 303. A surface of the soldering land 500 may be coated with lead (Pb) to increase an efficiency of a soldering work.

An uncovered portion 310 of a wire 300 in which a sheath is peeled off may be coated with lead (Pb) to increase an efficiency of a soldering work.

An area of the soldering land 500 may be formed wider than contact areas of the wires 301 and 303. This is to ensure an area sufficient to perform a soldering work by an operator and simultaneously to ensure heat capacity sufficient to store heat of an iron.

The fastening protrusion 453 may be formed in the lower cable holder 450. The fastening protrusion 453 may be coupled to the fastening groove 414 of the upper cable holder 410.

The fastening protrusion 453 may be formed in an upper surface of the lower cable holder 450. However, this is not limited thereto and the fastening protrusion 453 may be formed in any different position corresponding to the fastening groove 414 of the upper cable holder 410, for example, in a side of the lower cable holder 450.

A plurality of fastening protrusions 453 may be formed. The number of fastening protrusions 453 may be suitably controlled according to the desired fastening force between the upper cable holder 410 and the lower cable holder 450.

A protrusion fixing part 454 may be formed in the lower cable holder 450. The protrusion fixing part 454 may serve to fix the lower cable holder 450 onto the PCB 600.

The protrusion fixing part 454 may be formed in a hook form. However, this is not limited thereto and various types of fixing units configured to fix the lower cable holder 450 onto the PCB 600 may be employed.

The protrusion fixing parts 454 may be formed in both sides of the lower cable holder 450. The protrusion fixing parts 454 may be formed in both sides of the lower cable holder 450 to suitably place the edge of the lower cable holder 450 on the PCB.

The lower cable holder 450 may be mounted on the PCB 600 and the wires 301 and 303 inserted into the cable holder may be electrically coupled to the PCB 600 through soldering.

A molding treatment for insulation may be performed on an outer surface of the fan motor 100 on which the cable holder is mounted. A bulk molding compound (BMC) molding may be generally used.

Figure 14:
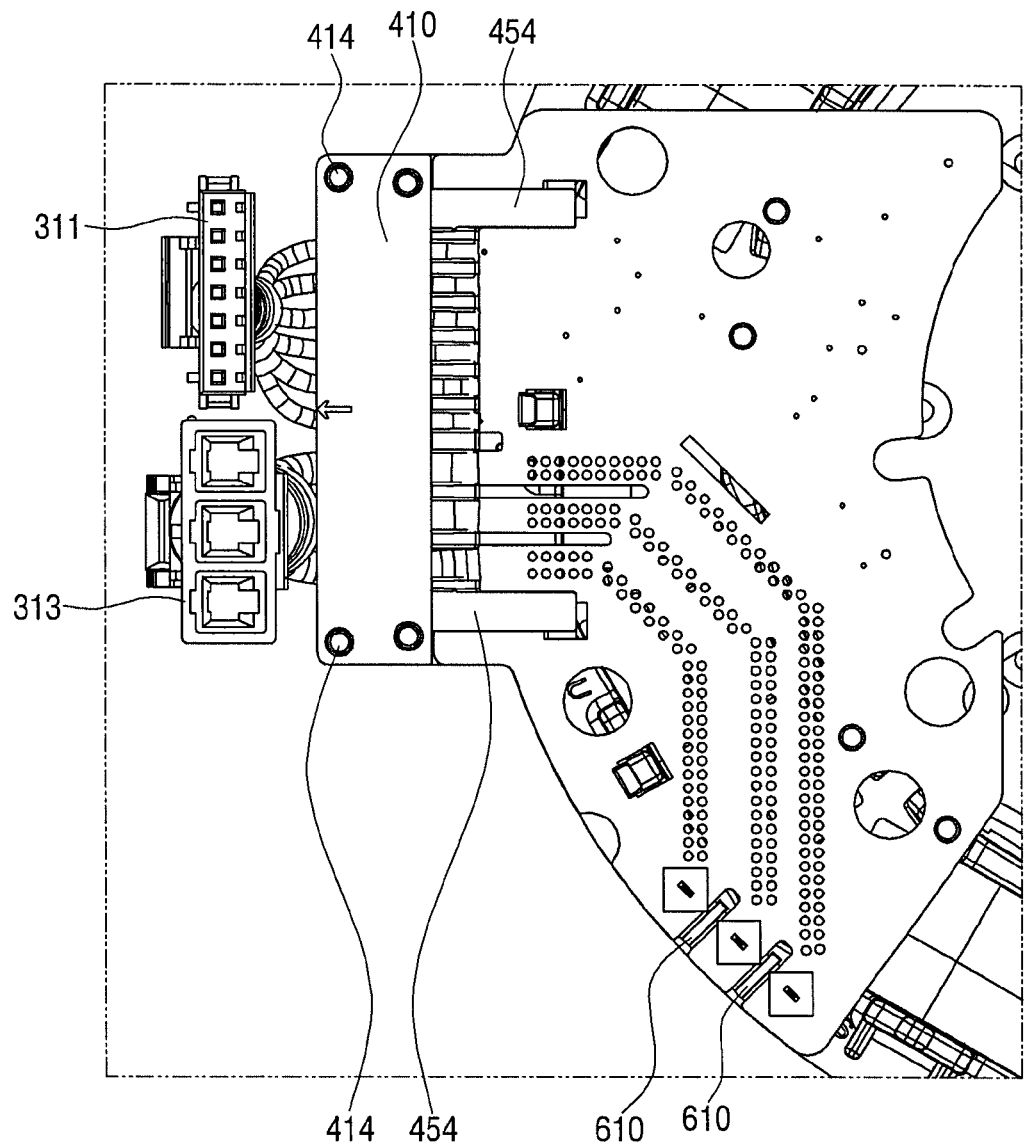
FIG. 14 is a plan view illustrating a board in which slits are formed according to an exemplary embodiment.

FIG. 14 is a plan view illustrating a board in which slits are formed.

Referring to FIG. 14, a plurality of slits 610 may be formed in the PCB 600. A molding solution may be filled within the slits 610 in the molding treatment to improve the insulation effect. Accordingly, the insulation effect may be increased by forming the slits 610 in portions of the PCB for which the insulation treatment is necessary.

A temperature of the BMC molding solution in the molding treatment may be generally about 120° C. The high-temperature molding solution may cause the wires 301 and 303 to be thermally damaged.

However, in response to the wires 301 and 303 being mounted on the cable holder according to an exemplary embodiment, the guide wall 451 may serve to separate the wires 301 and 303 from the wires 301 and 303 and may serve as a heat blocking layer configured to block the wires 301 and 303 from the molding solution so that surroundings of the wires 301 and 303 may not be covered with the molding solution.

Accordingly, the wires 301 and 303 having a low heat-resisting degree, for example, the wires 301 and 303 capable of withstanding a temperature lower than that of the BMC molding solution may be used as the wires 301 and 303 and thus the material cost may be reduced.

Figure 15:
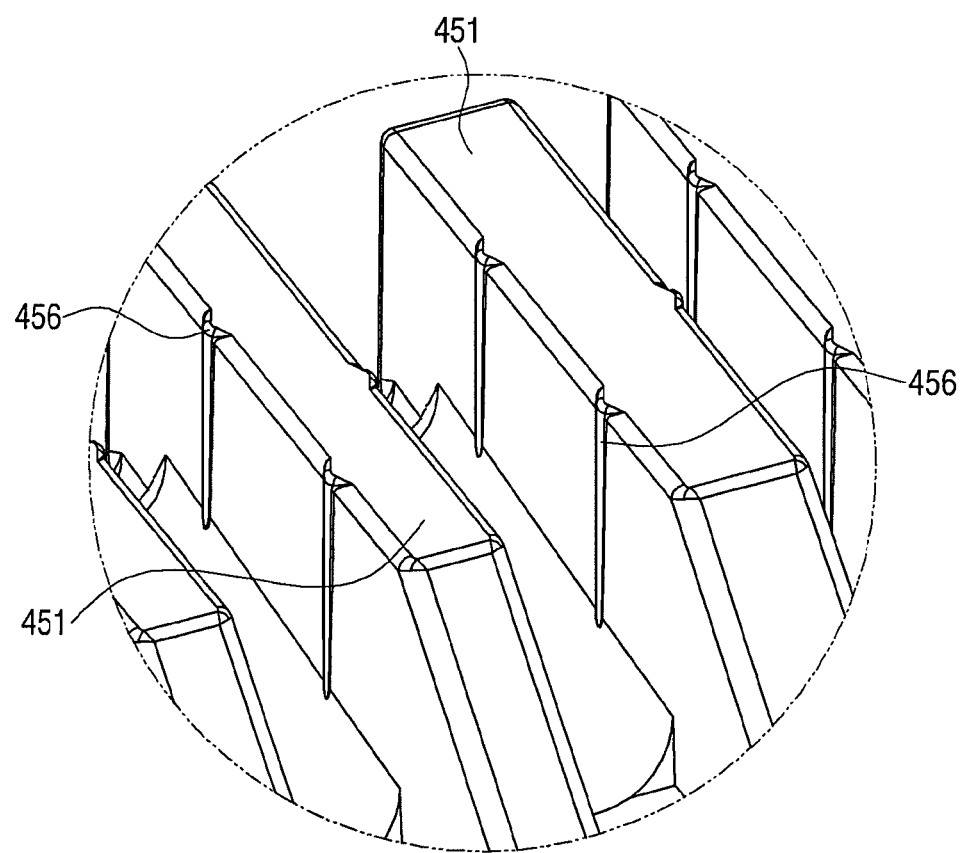
FIG. 15 is an enlarged perspective view illustrating a guide wall in a XV portion illustrated in FIG. 10.

FIG. 15 is an enlarged perspective view illustrating a guide wall according to an exemplary embodiment.

Referring to FIG. 15, a plurality of projections 456 may be formed in the guide wall 451 of the lower cable holder 450. The projections 456 formed in the guide wall 451 may serve to prevent the molding solution from smoothly flowing into the lead-in spaces of the wires 301 and 303 by blocking the movement of the molding solution.

The foregoing exemplary embodiments and advantages are merely exemplary and are not to be construed as limiting the disclosure. The teaching can be readily applied to other types of apparatuses. Also, the description of the exemplary embodiments of the disclosure is intended to be illustrative, and not to limit the scope of the claims, and many alternatives, modifications, and variations will be apparent to those skilled in the art. That is, it would be appreciated by those skilled in the art that changes may be made to these embodiments without departing from the principles and spirit of the disclosure, the scope of which is defined in the claims and their equivalents

What is claimed is:

1. A fan motor for an air conditioner, comprising:
a stator; and
a rotor, rotatably installed in an inside of the stator, the rotor including:
   a rotor shaft,
   a plurality of rotor cores arranged in a circumferential direction about a center of the rotor shaft and formed by a plurality of laminated plates disposed along a direction of the rotor shaft,
      wherein a first portion of the plurality of laminated plates is provided at at least one axial end of the plurality of rotor cores and includes a corresponding plurality of bridges provided at an innermost circumference of the plurality of rotor cores to respectively couple portions of each laminated plate of the plurality of laminated plates together to thereby couple the plurality of rotor cores together,
      wherein a second portion of the plurality of laminated plates is separated from the rotor shaft and does not include the plurality of bridges to reduce a leakage of magnetic flux through the plurality of bridges such that each rotor core of the second portion of the plurality of laminated plates is separated in a circumferential direction of the rotor shaft from an adjacent rotor core of the second portion of the plurality of laminated plates from the innermost circumference to an outermost circumference of the plurality of rotor cores, and
      wherein a third portion of the plurality of laminated plates includes the corresponding plurality of bridges provided at the innermost circumference of the plurality of rotor cores next to the rotor shaft on a first side of the rotor shaft and separated from the rotor shaft on a second side of the rotor shaft opposite to the first side,
   a plurality of permanent magnets, each of the plurality of permanent magnets being respectively disposed between adjacent rotor cores among the plurality of rotor cores, and
   an injection-molded supporting member disposed between the plurality of rotor cores and the rotor shaft, wherein the rotor shaft and the plurality of rotor cores of the rotor are coupled to each other and supported through the injection-molded supporting member, wherein a cross-section of an insertion portion of the rotor shaft inserted into the rotor cores is a non-circular shape,
wherein the insertion portion is formed on the second side of the rotor shaft, and
wherein a greatest outer diameter of the rotor shaft is less than a smallest inner diameter of the plurality of rotor cores.

2. The fan motor for an air conditioner as claimed in claim 1, wherein
a first laminated plate is included in laminated plates of a first rotor core among the plurality of rotors cores,
a second laminated plate is included in laminated plates of a second rotor core among the plurality of rotors cores,
the bridge is connected to a side of the first laminated plate facing the rotor shaft, and the bridge is connected to a side of the second laminated plate facing the rotor shaft, and
the first laminated plate and the second laminated plate are disposed in a same layer.

3. The fan motor for an air conditioner as claimed in claim 1, wherein the injection-molded supporting member is formed to cover both upper sides and lower sides of the plurality of rotor cores and formed to fill spaces provided between the rotor shaft, the plurality of rotor cores, and the plurality of permanent magnets.

4. The fan motor for an air conditioner as claimed in claim 3, wherein
the injection-molded supporting member includes a non-magnetic resin, and
the non-magnetic resin includes glass fiber.

5. The fan motor for an air conditioner as claimed in claim 1, wherein the injection-molded supporting member covers upper portions and lower portions of the plurality of rotor cores.

6. The fan motor for an air conditioner as claimed in claim 5, wherein the injection-molded supporting member further includes a plurality of connection molding parts which couple the upper portions and the lower portions of the plurality of rotor cores.

7. The fan motor for an air conditioner as claimed in claim 1, wherein a core hole is provided in each of the plurality of rotor cores and extends in a radial direction of the rotor core.

8. The fan motor for an air conditioner as claimed in claim 1, wherein the non-circular shape of the insertion portion of the rotor shaft inserted into the rotor cores is a D shape.

9. The fan motor for an air conditioner as claimed in claim 8, wherein
a plurality of insertion portions having the D-shaped non-circular cross-section are disposed on the rotor shaft,
each of the D-shaped non-circular cross-sections of the plurality of insertion portions are disposed on a first side of the rotor shaft, and
an upper end portion of the rotor shaft has a D-shaped non-circular cross-section disposed on a second side of the rotor shaft, opposite of the first side.

10. The fan motor for an air conditioner as claimed in claim 1, further comprising:
an upper cable holder in which a plurality of protrusion walls protrude downwardly;
a lower cable holder in which a plurality of guide walls protrude upwardly and are coupled between the plurality of protrusion walls; and
a soldering land disposed in a lower portion of the lower cable holder on which a wire is to be soldered thereto.

11. The fan motor for an air conditioner as claimed in claim 10, wherein a plurality of projections, configured to prevent outflow of a molding solution, protrude upwardly from an upper part of the plurality of guide walls.

12. The fan motor for an air conditioner as claimed in claim 10, wherein
a wire lead-in space, through which the wire is to be inserted toward the soldering land, is formed by a bottom surface of a protrusion wall among the plurality of protrusion walls, adjacent guide walls disposed at both sides of the protrusion wall, and a floor coupling the adjacent guide walls, and
a width of the wire lead-in space is smaller than a width of the wire.

13. The fan motor for an air conditioner as claimed in claim 12, wherein the wire lead-in space is inclined downwardly in a wire lead-in direction toward the soldering land.

14. The fan motor for an air conditioner as claimed in claim 10, wherein an area of the soldering land is larger than a contact area of the wire.

15. The fan motor for an air conditioner as claimed in claim 10, further comprising a printed circuit board (PCB) on which the lower cable holder is mounted, wherein a plurality of slits are provided in the PCB.

16. The fan motor for an air conditioner as claimed in claim 10, wherein a height of each of the plurality of guide walls of the lower cable holder decreases in a wire lead-in direction.

17. An air conditioner, comprising:
an indoor unit and an outdoor unit configured to perform a cooling or heating operation by circulating refrigerant between the indoor unit and the outdoor unit;
a fan, disposed in one of the indoor unit and the outdoor unit, configured to absorb or release heat generated in the cooling or heating operation; and
a fan motor, disposed in the one of the indoor unit and the outdoor unit, configured to control an air volume of the fan, the fan motor including:
a stator, and
a rotor, rotatably installed in an inside of the stator, the rotor including:
a rotor shaft,
a plurality of rotor cores, including a first rotor core, a second rotor core, and a third rotor core, arranged in a circumferential direction about a center of the rotor shaft,
wherein the plurality of rotor cores are formed by a plurality of laminated plates disposed along a direction of the rotor shaft,
wherein a first portion of the plurality of laminated plates is provided at at least one axial end of the plurality of rotor cores and includes a corresponding plurality of bridges provided at an innermost circumference of the plurality of rotor cores to respectively couple portions of each laminated plate of the plurality of laminated plates together to thereby couple the plurality of rotor cores together,
wherein a second portion of the plurality of laminated plates is separated from the rotor shaft and does not include the plurality of bridges to reduce a leakage of magnetic flux through the plurality of bridges such that each rotor core of the second portion of the plurality of laminated plates is separated in a circumferential direction of the rotor shaft from an adjacent rotor core of the second portion of the plurality of laminated plates from the innermost circumference to an outermost circumference of the plurality of rotor cores, and wherein a third portion of the plurality of laminated plates includes the corresponding plurality of bridges provided at the innermost circumference of the plurality of rotor cores next to the rotor shaft on a first side of the rotor shaft and separated from the rotor shaft on a second side of the rotor shaft opposite to the first side, a plurality of permanent magnets, including a first permanent magnet and a second permanent magnet, the first permanent magnet being disposed between the first rotor core and the second rotor core and the second permanent magnet being disposed between the second rotor core and the third rotor core, and an injection-molded supporting member disposed between the first rotor core and the rotor shaft, wherein the rotor shaft and the plurality of rotor cores of the rotor are coupled to each other and supported through the injection-molded supporting member, wherein a cross-section of an insertion portion of the rotor shaft inserted into the rotor cores is a non-circular shape, wherein the insertion portion is formed on the second side of the rotor shaft, and wherein a greatest outer diameter of the rotor shaft is less than a smallest inner diameter of the plurality of rotor cores.

\* \* \* \* \*